United States Patent
Horino

(10) Patent No.: US 10,250,772 B2
(45) Date of Patent: Apr. 2, 2019

(54) DEVICE MANAGAMENT APPARATUS, DEVICE MANAGEMENT SYSTEM, AND DEVICE MANAGEMENT METHOD

(71) Applicant: Hironori Horino, Tokyo (JP)

(72) Inventor: Hironori Horino, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 100 days.

(21) Appl. No.: 15/253,963

(22) Filed: Sep. 1, 2016

(65) Prior Publication Data

US 2017/0070632 A1    Mar. 9, 2017

(30) Foreign Application Priority Data

Sep. 9, 2015    (JP) ................................. 2015-177169

(51) Int. Cl.
*H04N 1/00*    (2006.01)
*H04N 1/32*    (2006.01)

(52) U.S. Cl.
CPC ..... *H04N 1/00973* (2013.01); *H04N 1/00344* (2013.01); *H04N 1/32496* (2013.01); *H04N 2201/0039* (2013.01); *H04N 2201/0094* (2013.01)

(58) Field of Classification Search
CPC ........... H04N 1/00973; H04N 1/00344; H04N 1/32496; H04N 2201/0039; H04N 2201/0094
See application file for complete search history.

(56) References Cited

U.S. PATENT DOCUMENTS

| | | | |
|---|---|---|---|
| 2006/0158674 A1* | 7/2006 | Mizoguchi | G06F 3/1205 358/1.13 |
| 2008/0301814 A1 | 12/2008 | Takahashi | |
| 2011/0141293 A1 | 6/2011 | Yoneyama et al. | |
| 2011/0173700 A1 | 7/2011 | Takahashi | |
| 2012/0030374 A1 | 2/2012 | Horino | |
| 2013/0163020 A1* | 6/2013 | Nakamura | H04N 1/00278 358/1.13 |

FOREIGN PATENT DOCUMENTS

| | | |
|---|---|---|
| JP | 2008-299811 | 12/2008 |
| JP | 2011-147118 | 7/2011 |
| JP | 5597556 | 8/2014 |

* cited by examiner

*Primary Examiner* — Kent Yip
(74) *Attorney, Agent, or Firm* — Cooper & Dunham LLP

(57) ABSTRACT

A device management apparatus configured to manage a managed device connected thereto via a network, the device management apparatus includes circuitry configured to: present use change information that allows a use change instruction of a function provided in the managed device; determine set values corresponding to the use change instruction for set values of various setting items required to execute the function to which the use change is instructed; and change the set values of the setting items related to the function to which the use change is instructed, for each of managed devices, from the set values before the use change instruction to the determined set values.

15 Claims, 12 Drawing Sheets

FIG.3

DEVICE MANAGEMENT DATABASE DB1

| Security Setting Item | | Set Value |
|---|---|---|
| SMTP | | Invalid |
| FTP | | Invalid |
| Netware | | Invalid |
| Appletalk | | Invalid |
| SNMP | V1/V2 | Invalid |
| | V3 | Invalid |
| SSL/TLS Version | TLS 1.2 | Invalid |
| | TLS 1.1 | Valid |
| | TLS 1.0 | Invalid |
| | SSL 3.0 | Invalid |
| Encryption | AES | 256 bit |
| | 3DES | Prohibited |
| | RC4 | Prohibited |
| Port | 23 | Invalid |
| | 80 | Invalid |
| | 443 | Valid |
| | 587 | Invalid |

NECESSARY SETTING LIST Lt1

| Function/Tool Name | Security Setting Item | | Set Value |
|---|---|---|---|
| Function A: Scan To Mail | SMTP | | Valid |
| | FTP | | — |
| | Netware | | — |
| | Appletalk | | — |
| | SNMP | V1/V2 | — |
| | | V3 | — |
| | SSL/TLS Version | TLS 1.2 | — |
| | | TLS 1.1 | — |
| | | TLS 1.0 | — |
| | | SSL 3.0 | — |
| | Encryption | AES | — |
| | | 3DES | — |
| | | RC4 | — |
| | Port | 23 | — |
| | | 80 | — |
| | | 443 | — |
| | | 587 | Valid |

FIG.6

NECESSARY SETTING LIST Lt2

| Function/Tool Name | Security Setting Item | | Set Value |
|---|---|---|---|
| Function B: Scan To NCB | SMTP | | — |
| | FTP | | — |
| | Netware | | Valid |
| | Appletalk | | — |
| | SNMP | V1/V2 | — |
| | | V3 | — |
| | SSL/TLS Version | TLS 1.2 | — |
| | | TLS 1.1 | — |
| | | TLS 1.0 | — |
| | | SSL 3.0 | — |
| | Encryption | AES | — |
| | | 3DES | — |
| | | RC4 | — |
| | Port | 23 | — |
| | | 80 | — |
| | | 443 | — |
| | | 587 | — |

FIG.9

SELECTION SCREEN G1

| Function/Tool Name | Current Use Situation | Use Setting |
|---|---|---|
| Function A | Used | Use |
| Function B | Used | Use |
| Function C | Not used | Do not use |
| External tool A | Not used | Do not use |
| External tool B | Used | Use |

Set  Cancel

FIG.11

INCIDENT INFORMATION REPORT SCREEN G2

| Function/Tool Name | Current Use Situation | Use Setting |
|---|---|---|
| Function A | Used | Use |
| Function B | Used | Use |
| Function C | Not used | Do not use |
| External tool A | 6/19 8:15 | Do not use |
| External tool B | Used | Use |

| Change because I want to use | Check measures against unauthorized attacks |
|---|---|

FIG.12

DEVICE MANAGEMENT DATABASE DB1

| Security Setting Item | | Set Value |
|---|---|---|
| SMTP | | Valid |
| FTP | | Invalid |
| Netware | | Valid |
| Appletalk | | Invalid |
| SNMP | V1/V2 | Invalid |
| | V3 | Invalid |
| SSL/TLS Version | TLS 1.2 | Valid |
| | TLS 1.1 | Invalid |
| | TLS 1.0 | Invalid |
| | SSL 3.0 | Invalid |
| Encryption | AES | 256 bit |
| | 3DES | Prohibited |
| | RC4 | Prohibited |
| Port | 23 | Invalid |
| | 80 | Invalid |
| | 443 | Invalid |
| | 587 | Valid |

DEVICE MANAGAMENT APPARATUS, DEVICE MANAGEMENT SYSTEM, AND DEVICE MANAGEMENT METHOD

CROSS-REFERENCE TO RELATED APPLICATIONS

The present application claims priority under 35 U.S.C. § 119 to Japanese Patent Application No. 2015-177169 filed Sep. 9, 2015. The contents of which are incorporated herein by reference in their entirety.

BACKGROUND OF THE INVENTION

1. Field of the Invention

The present invention relates to device management apparatuses, device management systems, and device management methods and, more particularly, relates to a device management apparatus, a device management system, and a device management method capable of using a function according to setting.

2. Description of the Related Art

A device such as a multifunction device, a copying device, a printer device, a facsimile device, and a personal computer is required to set a set value far each device in adequately using its function.

In recent years, however, an information processing device is diversifying because of an increase in functions to be installed.

In particular, it is important for the information processing device to prevent leak of information and intrusion of virus or so, i.e., to ensure security.

Therefore, in the information processing device, the setting in consideration of security is required for the set value in using the function, and there is a need for complex and difficult setting to set the use of each function.

Conventionally, an image forming apparatus is proposed, the image forming apparatus including a database configured to store protection property to be protected, threats against the protection property, and security measures against the threats; an acquiring unit configured to acquire basic information input by an administrator; a list making unit configured to make a list of the threats against protection property assumed from the basic information acquired by the acquiring unit and the security measures by referring to the database; and a list output unit configured to output the information listed by the list making unit (See Japanese Unexamined Patent Application Publication No. 2011-147118).

In other words, the conventional technology is configured to make a list of the threats of protection property assumed from the basic information input by the administrator and of the security measures and output the list. The basic information is information indicating a utilization form, security strength, basic functions to be used, installation environment, and so on.

However, in the conventional technology described in the publication, to set the use of a function of a device such as the image forming apparatus, the administration who inputs the basic information has to understand the utilization form, the security strength, the basic information to be used, and the installation environment etc of the device. Therefore, there is a problem that it is difficult to input appropriate basic information.

Accordingly, there is a need to easily set appropriate set values for purposes of using device functions.

SUMMARY OF THE INVENTION

Exemplary embodiments of the present invention, there is provided a device management apparatus configured to manage a managed device connected thereto via a network, comprising: circuitry configured to: present use change information that allows a use change instruction of a function provided in the managed device; determine set values corresponding to the use change instruction for set values of various setting items required to execute the function to which the use change is instructed; and change the set values of the setting items related to the function to which the use change is instructed, for each of managed devices, from the set values before the use change instruction to the determined set values.

Exemplary embodiments of the present invention also provide a device management system configured so that a device management apparatus and a managed device as a management target are connected to each other via a network. In the device management system, the managed device includes: a device communication unit configured to communicate with the device management apparatus via the network, a storage configured to store functions included in the local device, a setting item required to execute the function for each of the functions, and a set value corresponding to the use setting of the function for the setting item, and circuitry configured to control the storage of the setting item and the set value for each of the functions of the storage according to a use change instruction from the device management apparatus, and execute the function based on the set value for the setting item. And, in the device management apparatus, the device management apparatus includes the circuitry configured to: communicate with the managed device via the network, present use change information that allows a use change instruction of a function provided in managed device, determine set values corresponding to the use change instruction for set values of various setting items required to execute the function to which the use change is instructed, and change the set values of the setting items related to the function to which the use change is instructed for each managed device, from the set values before the use change instruction to the determined set values.

Exemplary embodiments of the present invention also provide a device management method executed by a device management apparatus configured to manage a managed device connected thereto via a network, the device management method comprising: presenting use change information that allows a use change instruction of a function provided in the managed device; determining set values corresponding to the use change instruction for set values of various setting items required to execute the function to which the use change is instructed; and changing the set values of the setting items related to the function to which the use change is instructed, for each of managed devices, from the set values before the use change instruction to the determined set values.

BRIEF DESCRIPTION OF THE DRAWINGS

FIG. 3 is a diagram illustrating an example of a device management database related to security;

FIG. 6 is a diagram illustrating an example of a device management database related to a Scan to NCB function;

FIG. 9 is a diagram illustrating an example of a selection screen;

FIG. 11 is a diagram illustrating an example of an incident information report screen; and FIG. 12 is a diagram illustrating the device management database of FIG. 3 after update.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
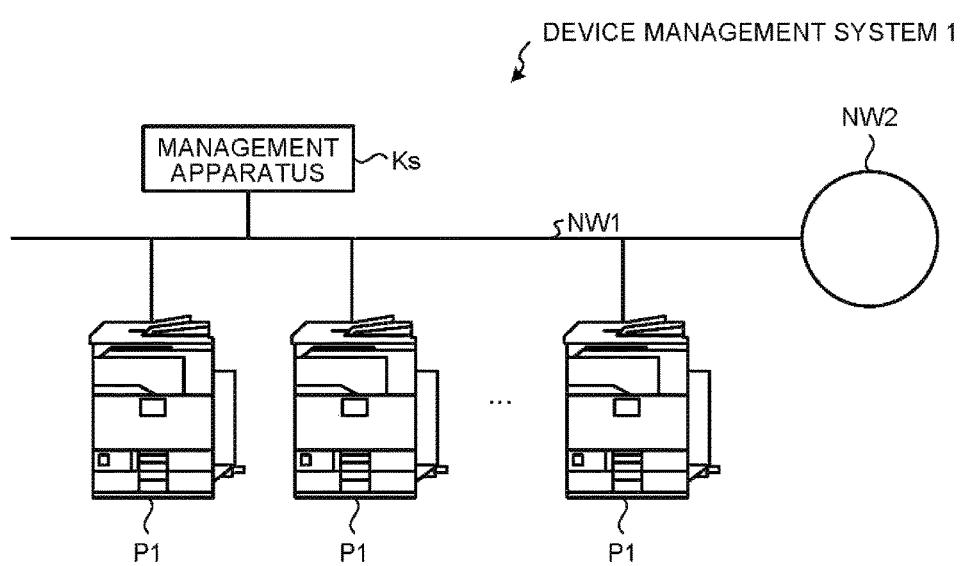
FIG. 1 is a configuration diagram of a device management system to which embodiments of the present invention are applied.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention will be explained in detail below with reference to the accompanying drawings. The embodiments explained below are the exemplary embodiments of the present invention, and therefore technologically favorable various limitations are added thereto, however, the scope of the present invention is not limited unreasonably by the following explanation, and all the components as explained in the embodiments are not necessarily the essential elements of the present invention.

FIG. 1 to FIG. 12 are diagrams illustrating embodiments of the device management apparatus, the device management system, and the device management method of the present invention. FIG. 1 is a configuration diagram of a device management system 1 to which embodiments of the device management apparatus, the device management system, and the device management method of the present invention are applied.

As illustrated in FIG. 1, the device management system 1 is configured so that a management apparatus (device management apparatus) Ks is connected to a plurality of devices (managed devices) P1 to Pn via a network NW1 such as a wired or wireless local area network (LAN). The network NW1 may be connected to other network NW2 such as the Internet via a terminal adaptor (not illustrated), etc. In the following, a case where the management apparatus Ks manages the devices P1 to Pn connected to the network NW1 as the managed devices will be explained, however, the managed devices may be connected to the network NW2.

The device management system 1 is configured so that the management apparatus Ks manages the functions provided in each of the devices P1 to Pn. The management apparatus Ks controls the operation of a function and its range of each of the devices P1 to Pn by setting a set value required to operate respective functions of the devices P1 to Pn for each of the devices P1 to Pn.

The device management system 1 is configured so that the networks NW1 and NW2 are connected with a host device such as a computer for causing the devices P1 to Pn to perform various types of image processing operations although it is not illustrated in FIG. 1. The host device transmits, for example, a print job including print data and setting information to the devices P1 to Pn, and requires image processing such as a printing operation that cause the devices P1 to Pn to print the data and a scanning operation that causes the devices P1 to Pn to read a document image and transmit the read image data thereto, and the like.

Figure 2:
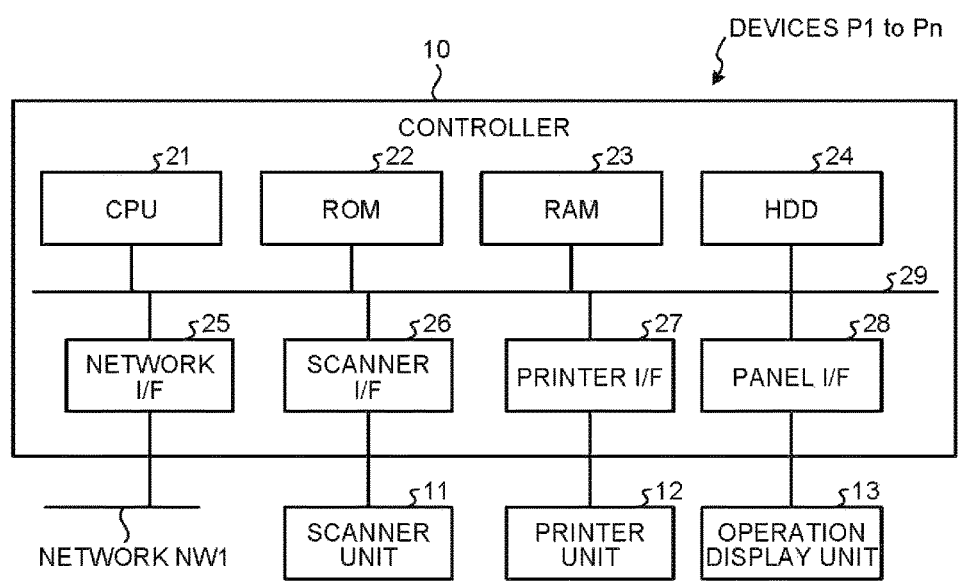
FIG. 2 is a block diagram of hardware of devices.

The devices P1 to Pn are various types of devices such as a multifunction device, a copying device, a facsimile device, a printer device, a scanner device, and a computer, and, for example, the multifunction device is a block configuration as illustrated in FIG. 2. Each of the devices P1 to Pn includes a controller 10, a scanner unit 11, a printer unit 12, and an operation display unit 13, etc.

The operation display unit 13 includes various keys and a display. Various operation instructions are input to the devices P1 to Pn through the keys, and contents input through the keys and various types of information to be notified to a user from the devices P1 to Pn are displayed on the display.

As for the scanner unit 11, for example, a scanner using a charge coupled device (CCD) or a complementary metal oxide semiconductor (CMOS) is used as a photoelectric conversion device. The scanner unit 11 performs an image reading function for scanning a document, reading an image of the document, and outputting image data.

For example, a printer of an ink ejection system or of an electrophotographic system is used as the printer unit 12. In the case of the printer of the ink election system, the printer unit 12 includes a recording head in which nozzles for ejecting ink of colors (RGB colors, MCYK colors, etc.) are formed, while in the case of the printer of the electrophotographic system, the printer unit 12 includes, for example, image formation units of the colors. The printer unit 12 performs an image forming function for applying a recording agent such as toner through the nozzles to a sheet of paper (recording medium) to form an image based on the image data of the document read by the scanner unit 11 or the image data transmitted from the host device via the network NW1.

The controller 10 includes a central processing unit (CPU) 21, a read only memory (ROM) 22, a random access memory (RAM) 23, a hard disk (HDD) 24, a network interface (I/F) 25, a scanner I/F 26, a printer I/F 27, and a panel I/F 28, which are connected to each other via a bus 29.

The network I/F 25 is connected with the network NW1, and transmits/receives a control signal and control data, etc. to/from the management apparatus Ks via the network NW1. The network I/F 25 also transmits/receives a control signal and control data, etc. to/from the host device. Particularly, the network I/F 25 transmits a use situation of each function installed in each of the devices P1 to Pn to the management apparatus Ks under the control of the CPU 21, and receives a set value of the function transmitted from the management apparatus Ks to be transmitted to the CPU 21.

The ROM 22 stores programs for controlling processing and management of data in the controller 10 and controlling peripheral modules, and also stores various types of data required to perform the programs. Specifically, the ROM 22 stores various programs such as a basic processing program required for the devices P1 to Pn and programs for executing part of device management method to be executed by the devices P1 to Pn, of the device management method according to the present invention, and stores required data.

The CPU 21 controls each unit of the devices P1 to Pn while using the RAM 23 as a work memory and performs image processing such as print processing, image reading processing, copying processing, and transfer processing based on the programs stored in the ROM 22. Particularly, the CPU 21 performs processing for acquiring the use situation of each function provided in the devices P1 to Pn and transmitting the acquired use situation of the function to the management apparatus Ks as part of the device management method according to the present invention, explained later, based on the programs according to the present invention in the ROM 22. When receiving the set value for the function from the management apparatus Ks, the CPU 21 registers the set value as a set value of the function and executes the function based on the set value.

The RAM 23 is used as a work memory of the CPU 21, and is also used, in order to perform various types image processing, as a buffer that manages and temporarily stores image data page by page and also as a bitmap memory that converts the data stored in the buffer into drawing data suitable for actual printing.

The hard disk 24 stores data such as the image data of the document read by the scanner unit 11 and the image data transmitted from the host device under the control of the CPU 21, and reads the data.

In particular, the hard disk 24 stores set values set for each function provided in the devices P1 to Pn as device management database. The hard disk 24 stores set values related to security, for example, in the form of a security-related device management database as illustrated in FIG. 3 under the control of the CPU 21.

The controller 10 includes an external I/F (not illustrated), and an additional tool for adding a function to the external I/F can be connected the controller 10.

FIG. 3 is a device management database DB1 related to security, which stores setting items related to security and set values thereof. As illustrated in FIG. 3, the device management database DB1 registers, as Security Setting Item, SMTP, File transfer protocol (FTP), Netware, Appletalk, Simple network management protocol (SNMP) including V1/V2 and V3, Secure socket layer (SSL)/Transport layer security (TLS) including TLS 1.2, 1.1, 1.0 and SSL 3.0, Encryption (AES, 3DES, RC4), and Port (23, 80, 443, 587), and set values as Valid and Invalid are set respectively to the setting items. In the device management database DB1 of FIG. 3, Valid is set to TLS 1.1 of SSL/TLS and to Port 443, and 256-bit is set to AES, and the rest of the items are set to Invalid or Prohibited. The devices P1 to Pn keep the device management database DB1 in which the respective set values are set according to a current performance set status. The device management database DB1 registers not only the security setting items but also setting items and set values required to execute various functions.

The scanner I/F 26 is connected with the scanner unit 11, and is used to transmit/receive signals and data in such a manner that a control signal is transmitted from the controller 10 to the scanner unit 11 and a status signal and image data of the read document etc are transmitted from the scanner unit 11 to the controller 10.

The printer I/F 27 is connected with the printer unit 12, and is used to transmit/receive signals and data in such a manner that a control signal and drawing data are transmitted from the controller 10 to the printer unit 12 and a status signal is transmitted from the printer unit 12 to the controller 10.

The panel I/F 28 is connected with the operation display unit 13, and is used to transmit/receive a signal and data between the CPU 21 and the operation display unit 13.

The devices P1 to Pn are configured so that the controller 10 includes the external I/F, and, for example, an external storage unit having a portability may be detachably attached to each of the devices P1 to Pn. In this case, for example, Universal Serial Bus (USB) memory, a memory card (e.g., SD memory card), and a floppy disk (registered trademark) are used.

An information processing device such as a computer having normal hardware configuration and software configuration is used as the management apparatus Ks, and programs for executing the device management method according to the present invention are installed therein as software.

Figure 4:
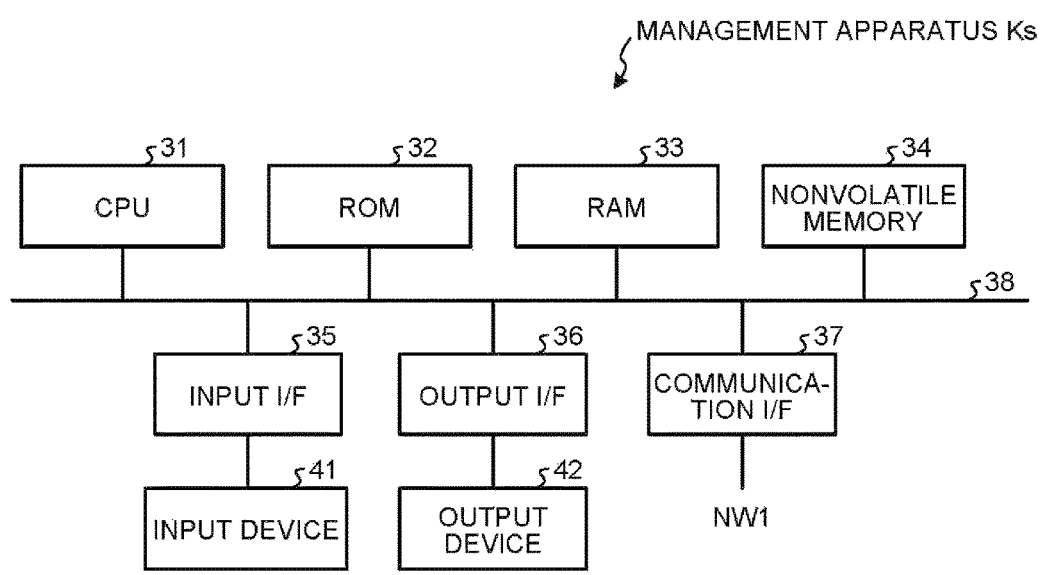
FIG. 4 is a block diagram of a management apparatus.

For example, the management apparatus Ks includes, as illustrated in FIG. 4, a CPU 31, a ROM 32, a RAM 33, a nonvolatile memory 34, an input I/F 35, an output I/F 36, and a communication I/F 37, etc. which are connected to each other via a bus 38.

The input I/F 35 is connected with an input device 41 such as a keyboard, a mouse, a stylus pen, and a touch panel, and outputs various instructions or the like input through the input device 41 to the CPU 31.

The output I/F 36 is connected with an output device 42 such as a display, a lamp, and a speaker, and outputs output data such as display data, flashing data, sound data or the like to the output device 42 under the control of the CPU 31.

The communication I/F 37 is connected with the network NW1, and performs control of protocol such as Transmission Control Protocol/Internet Protocol (TCP/IP), Simple Mail Transfer Protocol (SMTP)/Point Of Production (POP) under the control of the CPU 31. The communication I/F 37 communicates with the devices P1 to Pn via the network NW1 and the network NW2 under the control of the CPU 31. Particularly, the communication I/F 37 acquires a use situation of each function of the devices P1 to Pn via the network NW1 from the devices P1 to Pn under the control of the CPU 31.

The ROM 32 stores a basic program required for the management apparatus Ks, programs for performing the device management method according to the present invention system data, and the like.

The RAM 33 is used as a work memory of the CPU 31 and stores management data, other data, and the like.

The CPU 31 uses the RAM 33 as a work memory based on the programs in the ROM 32, and controls the units of the management apparatus Ks to execute the basic processing required for the management apparatus Ks. The CPU 31 performs the device management method according to the present invention based on the programs for the device management method in the ROM 31.

The nonvolatile memory 34 is a memory that uses a nonvolatile random access memory (NVRAM), a solid state drive (SSD), and a hard disk, or the like, and keeps storage contents even when the power of the management apparatus Ks is off.

The nonvolatile memory 34 stores, as data required to keep the storage contents even when the power of the management apparatus Ks is off, various data used in the device management method according to the present invention such as OS environment information of the devices P1 to Pn to be managed and various programs to be installed into the devices P1 to Pn under the control of the CPU 31.

Figure 5:
FIG. 5 is a diagram illustrating an example of a device management database related to a Scan to Mail function.

The nonvolatile memory 34 stores necessary setting lists Lt1 and Lt2 as illustrated in FIG. 5 and FIG. 6 as data used in the device management method.

The necessary setting lists Lt1 and Lt2 are lists of set values such as security set values that each function or tool requires. In other words, each function or tool provided in the devices P1 to Pn becomes available or unavailable depending on the security settings, and therefore the management apparatus Ks keeps the security set values that each function or tool requires as the necessary setting lists Lt1 and Lt2.

FIG. 5 is the necessary setting list Lt1 related to Scan to Mail function, in which Function A: Scan to Mail is registered as Function/Tool Name, and a security setting item and a set value are registered. The security setting item is the same as the security setting item of FIG. 3, and the set value of Valid is set only to SMTP and Port 587 of the security setting item.

FIG. 6 is the necessary setting list Lt2 related to Scan to NCB function, in which Function B: Scan to NCB is registered as Function/Tool Name, and a security setting item and a set value are registered. The security setting item is the same as the security setting item of FIG. 3, and the set value of Valid is set only to Netware of the security setting item.

The management apparatus Ks stores the device management database DB1 in the nonvolatile memory 34 in each of the devices P1 to Pn for each function included in each of the devices P1 to Pn, and stores the necessary setting lists Lt1 and Lt2 for the functions and tools.

The device management system 1 is configured so that the management apparatus Ks and each of the devices P1 to Pn read programs for executing the device management method according to the present invention recorded in a computer-readable recording medium such as a ROM, an electrically erasable programmable read only memory (EEPROM), EPROM, a flash memory, a flexible disc, a compact disc read only memory (CD-ROM), a compact disc rewritable (CD-RW), a digital versatile disk (DVD), a Universal Serial Bus (USB) memory, a secure digital (SD) card, and a magneto-optical disc (MO), to introduce the read program to the ROM 32 and the nonvolatile memory 34 of the management apparatus Ks and to the ROM 22 and the hard disk 24 of the devices P1 to Pn. Thereby, the device management system 1 is constructed as a device management system that includes the device management apparatus that performs the device management method for easily setting a set value appropriate for the use situation of each function of the devices P1 to Pn, which are managed devices explained later, to the devices P1 to Pn, and also includes the devices P1 to Pn managed by the management apparatus Ks. The program for executing the device management method is a computer-executable program described in a legacy programming language and an object-oriented programming language, etc. such as Assembler, C, C++, C#, and Java (registered trademark), and can be distributed by being stored in the recording medium.

Figure 7:
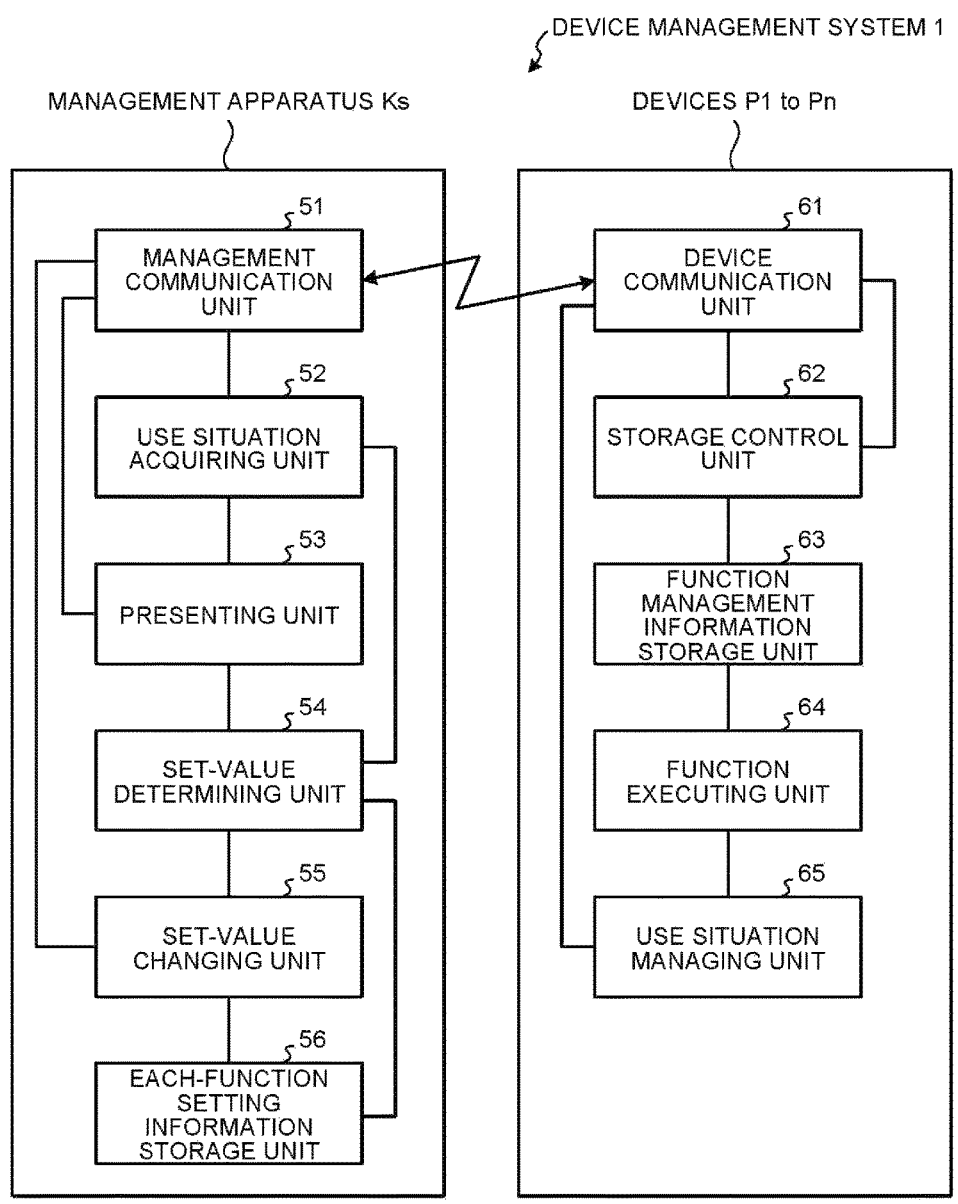
FIG. 7 is a functional block diagram of the management apparatus and the devices.

The program for executing the device management method is introduced to the management apparatus Ks and to the devices P1 to Pn, and the functional blocks as illustrated in FIG. 7 are thereby constructed. In other words, with the introduction of the program, as illustrated in FIG. 7, a management communication unit 51, a use situation acquiring unit 52, a presenting unit 53, a set-value determining unit 54, a set-value changing unit 55, and an each-function setting information storage unit 56 are built in the management apparatus Ks. With the introduction of the program, as illustrated in FIG. 7, a device communication unit 61, a storage control unit 62, a function management information storage unit 63, a function executing unit 64, and a use situation managing unit 65 are built in each of the devices P1 to Pn.

The functional blocks of the management apparatus Ks will be explained first. The management communication unit 51 is constructed by the communication I/F 37 and communicates with the devices P1 to Pn, which are managed devices, via the network NW1. Therefore, the management communication unit 51 functions as a management communication unit.

The use situation acquiring unit 52 is constructed by the CPU 31, and acquires a use situation of each function included in the devices P1 to Pn via the management communication unit 51. Therefore, the use situation acquiring unit 52 functions as a use situation acquiring unit. In this case, the use situation acquiring unit 52 uses a list of the devices P1 to Pn to be managed, registered in the each-function setting information storage unit 56 which is explained later, network addresses of the devices P1 to Pn, and of authentication information to access the devices P1 to Pn, and collects information from the devices P1 to Pn, respectively. The use situation acquiring unit 52 acquires even presence/absence information of a use request for each function included in the devices P1 to Pn as use situation information. The presence/absence information for the use request includes information as to whether there is a use request for a function whose set value is registered as "Not used" in the devices P1 to Pn. Furthermore, the use situation acquiring unit 52 also acquires presence/absence information of additional functions to the devices P1 to Pn.

The presenting unit 53 is constructed by the CPU 31 and the output device 42, and presents the use situation information of each function in the devices P1 to Pn and use change information that allows a use change instruction of the function by being output for notification. Therefore, the presenting unit 53 functions as a presenting unit. When the use situation acquiring unit 52 acquires the presence/absence information of the use request for each function included in the devices P1 to Pn as the use situation information, the presenting unit 53 presents the information including even the presence/absence information of the use request for each function as the use situation information. Furthermore, when the use situation acquiring unit 52 acquires the fact that there is a use request for the function whose set value is registered as Not used, the presenting unit 53 presents the use situation information including the information accordingly. When the use situation acquiring unit 52 acquires the use situation information including the presence/absence information of the additional functions to the devices P1 to Pn, the presenting unit 53 presents the use situation information and the use change information which allows even an instruction as to whether the additional function is used.

The set-value determining unit 54 is constructed by the CPU 31, and determines a set value corresponding to the use change instruction for each function of the devices P1 to Pn to which the use change is instructed, based on set values of various setting items required to execute the function. Therefore, the set-value determining unit 54 functions as a set-value determining unit. The set-value determining unit 54 also determines set values of setting items for the function based on the order of priority to prioritize ensuring of the security. Furthermore, when there is a plurality of functions to which use change is instructed, the set-value determining unit 54 determines whether there is a common setting item which is commonly required among the functions, and sets the set value, for the common setting item, to a common set value corresponding to the use change instruction among all the functions.

The set-value changing unit 55 is constructed by the CPU 31 and the communication I/F 37. The set-value changing unit 55 changes the set values of the setting items related to the function, stored in the function management information storage unit 63 of each of the devices P1 to Pn, to which the use change is instructed, from the set values before the use change instruction to the set values determined by the set-value determining unit 54. Therefore, the set-value changing unit 55 functions as a set-value changing unit.

The each-function setting information storage unit 56 is constructed by the nonvolatile memory 34, and stores various setting items required to execute the function for each function and set values corresponding to the execution stage of the function set for the setting item, as the necessary setting lists Lt1 and Lt2 of FIG. 5 and FIG. 6, or the like. Therefore, the each-function setting information storage unit 56 functions as an each-function setting information storage unit. In this case, the set-value determining unit 54 refers to the each-function setting information storage unit 56 based on the use change instruction, and determines the set values of the setting items that can execute the function to which the use change is instructed.

The functional blocks of the devices P1 to Pn will be explained next. The device communication unit 61 is constructed by the network I/F 25, and communicates with the management apparatus Ks via the network NW1. Therefore, the device communication unit 61 functions as a device communication unit.

The function management information storage unit 63 is constructed by the hard dish 24, and stores functions included in the local device, setting items required to execute the function for each of the functions, and a set value corresponding to the use setting of the function for the setting item, as the device management database DB1. Therefore, the function management information storage unit 63 functions as a function management information storage unit.

The storage control unit 62 is constructed by the CPU 21, and controls storage of the setting item and the set value for each function in the function management information storage unit 63. Therefore, the storage control unit 62 functions as a storage control unit.

The function executing unit 64 is constructed by the CPU 21, and executes each function such as the scanner function, the print function, the Scan to Mail function, and the Scan to NCB function based on the set value for the setting item. Therefore, the function executing unit 64 functions as a function executing unit.

The use situation managing unit 65 is constructed by the CPU 21, and manages the use situation of the functions executed by the function executing unit 64 and the access from an external tool thereto. Therefore, the use situation managing unit 65 functions as a use situation managing unit. The use situation managing unit 65 temporarily stores a use result of the managed function in the storage unit such as the hard disk 24, and transfers the use result to the management apparatus Ks in response to a request from the management apparatus Ks via the device communication unit 61.

Operations of the present embodiment will be explained next. In the device management system 1 according to the present embodiment, the management apparatus Ks easily sets a set value appropriate for purposes of using the functions.

In other words, the devices P1 to Pn to be managed in the device management system 1 are configured so that execution of a function is requested from the host device on the networks NW1 and NW2 and execution of a function is requested through an operation for the operation display unit of each of the devices P1 to Pn.

The devices P1 to Pn are configured so that the function executing unit 64 refers to a setting item and its set value required to execute the function of the function management information storage unit 63 for the requested function, to control the execution or the non-execution of the function requested according to the set status.

The devices P1 to Pn are configured so that when the function executing unit 64 performs the processing of the execution or the non-execution for the function request, the use situation managing unit 65 acquires the processing result as the use situation to be stored and managed. When an external tool is added, the devices P1 to Pn acquire the information to that effect to be stored and managed.

Figure 8:
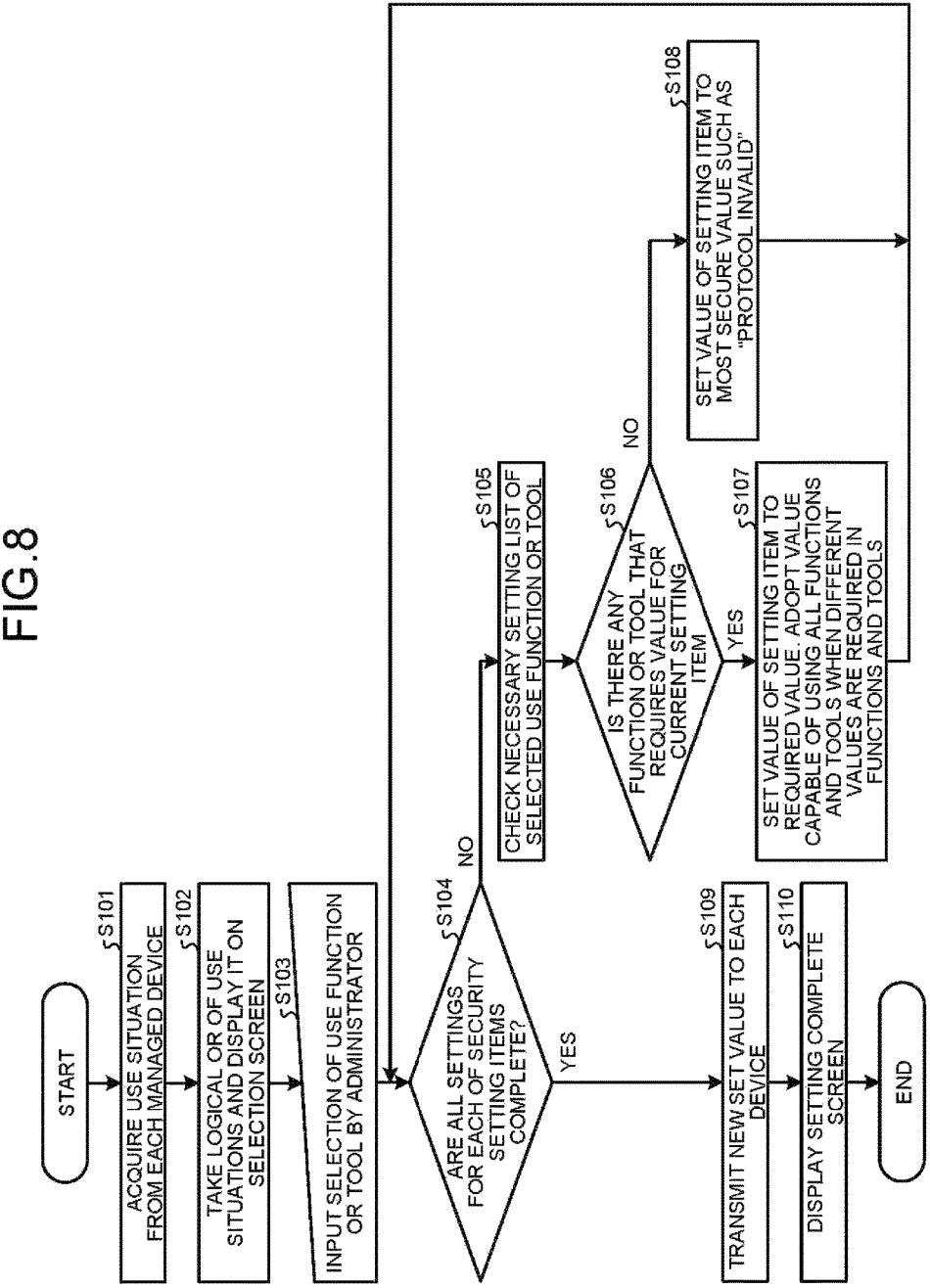
FIG. 8 is a flowchart illustrating device management processing.

On the other hand, as illustrated in FIG. 8, the management apparatus Ks sets set values of the setting items of the devices P1 to Pn according to a selection operation of an administrator of each of the devices P1 to Pn, however, basically, all the set values of the setting items are set to highest security set values. For the function (additional function: including an additional tool) of which execution is requested by the administrator, the management apparatus Ks changes the set value from the high security set value to a loosened set value within a range satisfying the request.

It is assumed that set values such as "valid", "invalid", "prohibited", and "256-bit" are registered in, for example, the security setting item as illustrated in FIG. 4 in one of the devices P1 to Pn.

The management apparatus Ks executes the device management processing as illustrated in FIG. 8 at appropriate timing. That is, in the management apparatus Ks, the use situation acquiring unit 52 acquires the use situation from each of the devices P1 to Pn to be managed via the management communication unit 51 when management timing arrives (Step S101). As for the acquisition of the use situation, the administrator operates an input device of the management apparatus Ks to make a use-situation acquisition request by using a Web application, so that the use situation acquiring unit 52 may acquire the use situation via the management communication unit 51.

The use situation acquiring unit 52 transmits the acquired use situations of the devices P1 to Pn to the presenting unit 53, and the presenting unit 53 takes a logical OR of the use situations of the devices P1 to Pn, and outputs and displays, for example, a selection screen G1 as illustrated in FIG. 9 (Step S102). Specifically, the presenting unit 53 displays the selection screen G1 on the display of the output device 42. The selection screen G1 of FIG. 9 displays Current Use Situation ("Used", "Not used") and Use Setting ("Use", "Do not use") for each function and tool, and further displays "Set" button and "Cancel" button.

Taking the logical OR of the use situations of the devices P1 to Pn is because when the use situations of the functions and tools are different from each other in the devices P1 to Pn, the administrator can easily recognize the use situations of the functions and tools in the devices P1 to Pn. For example, when by taking the logical OR, it is found that both some of the devices P1 to Pn with "Used" and some of the devices P1 to Pn with "Not used" are present, the presenting unit 53 gives priority to "Used" and displays "Used" in the selection screen G1. In this case, the presenting unit 53 may display "Partially used" in the selection screen G1 if there are functions and tools in which "Used" and "Not used" are mixed. How to display the selection screen G1 using presentation of the use situations is not limited to the method of taking the logical OR. For example, detailed information, for example, the number of use times, date and time, and which of the devices P1 to Pn is used may be specifically presented. In other words, it is important for the information presented on the selection screen G1 is information that makes the administrator easily select any function and tool suitable for an actual use situation. Therefore, if the function or tool is "Used", an initial value of a selection item is set to "Use", or if the function or tool is "Not used", an initial value of the selection item is set to "Do not use", and these settings make the operation of the administrator to be reduced.

When presenting the presentation of the use situation as the selection screen G1, the presenting unit 53 receives an input of selection of a use function or tool by the administrator through the selection screen G1, and sequentially transmits received contents to the set-value determining unit 54 (Step S103).

The set-value determining unit 54 sequentially checks whether all the settings for each of the setting items are complete (Step S104).

At Step S104, when all the settings are not complete (No at Step S104), the set-value determining unit 54 checks the necessary setting lists Lt1 and Lt2 of the selected use function or tool (Step S105).

The set-value determining unit 54 checks whether there is any function or tool that requires a set value of the current setting item (Step S106).

At Step S106, when there is any function or tool that requires a set value (Yes at Step S106), the set-value determining unit 54 changes the set value of the setting item to the required value. In this case, when different values are required in a plurality of functions and tools, the set-value determining unit 54 sets a value so that all the functions and tools can be used (step S107).

At Step S106, when there is no function or tool that requires a set value (No at Step S106), the set-value determining unit 54 sets a value of the set value to a most secure value on the security such as "Protocol invalid" (Step S108).

In other words, the set-value determining unit 54 refers to the necessary setting lists Lt1 and Lt2 for the function and tool that the administrator selects as "Use". As for the setting items registered in the necessary setting lists Lt1 and Lt2, etc., the set-value determining unit 54 sets a value required in the necessary setting lists Lt1 and Lt2 etc so that the function and tool can be used. In this case, when the value falls within the functions and tools, the set-value determining unit 54 sets a restriction-loose value so that all the function and tools can be used. For example, when a length of a key required by encryption communication is to be set, the set-value determining unit 54 sets "128-bit or more" as a key length when a tool corresponding to (64, 128, 256)-bit and a tool corresponding to only 128-bit are selected as the length of the key as the function or tool to be used.

Specifically, first of all, the set-value determining unit 54 sets all the setting items to a value whose security setting is highest (set values or the like whose protocol is invalidated, so that the set values cannot be used), and then refers to a list of the function or tool selected as "Use". The set-value determining unit 54 sets a set value by a method in which it is changed to a set value that can be used as a set value in a direction of "loosing" the required setting item.

By doing this, the administrator can determine that it is currently used or is not used even if he/she does not fully understand the name of a function or of a tool to be used, and can set a setting item and a set value appropriate for the function or tool whose usage is selected.

How the set-value determining unit 54 sets a set value of the setting item is not limited to the method.

At Steps S107 and S106, when the set value is set, the set-value determining unit 54 returns to Step S104, and checks whether all the settings are complete (Step S104).

At Step S104, when all the settings are not complete, the set-value determining unit 54 sets a set value of the setting item for the selected use function or tool in the above manner (Steps S105 to S108).

At Step S104, when all the settings are complete (Yes at Step S104), the set-value determining unit 54 transmits the determined setting item and set value to the set-value changing unit 55, and notifies the presenting unit 53 accordingly. The set-value changing unit 55 transmits the determined setting item and the set value along with a setting command to each of the devices P1 to Pn via the management communication unit 51 (Step S109). In each of the devices P1 to Pn, the storage control unit 62 registers the received setting item and set value in the function management information storage unit 63 based on the received setting command, to reflect the received setting item and set value.

When receiving the notification that the determined setting item and set value are transmitted to the set-value changing unit 55 from the set-value determining unit 54, the presenting unit 53 displays a setting compete screen and ends the device management processing (Step S110).

The device management system 1 executes the device management processing, and thereby updates, as illustrated in FIG. 12, the device management database DB1 of FIG. 3 stored in the function management information storage unit 63 of each of the devices P1 to Pn. In other words, the device management database DB1 of FIG. 12 is updated from the device management database DB1 of FIG. 3 in such a manner that SMTP, Netware, TLS 1.2 of SSL/TLS version, and Port "587" are updated to "Valid" from "Invalid", and TLS 1.1 of SSL/TLS version and Port "443" are updated to "Invalid" from "Valid".

The management apparatus Ks may be configured to periodically perform the device management processing at predetermined intervals set beforehand.

When a new function can be added by sales of a new tool or update of software for the devices P1 to Pn, the management apparatus Ks may acquire information for a setting item and a set value from a provider of the tool or of the function, to add or update the acquired information as a necessary setting list.

By doing this, the management apparatus Ks can set collectively set values of setting items according to use situations of the devices P1 to Pn to be managed, and can easily set the set values appropriate for the use situations of the functions of the devices P1 to Pn.

In the device management system 1, the management apparatus Ks sets the set value of the required setting item on the function or tool. However, the devices P1 to Pn may be unable to execute the function or tool to which an execution request is made depending on the set value, which may cause any error to occur.

Accordingly, in the device management system 1, when the setting status of the set value of the setting item, for example, security settings cause an error to occur, such that execution of a function or a tool, for example, execution of communication is rejected, each of the devices P1 to Pn records the function in which the error occurs. In other words, the use situation managing unit 65 monitors execution of the function or tool by the function executing unit 64, records, when an error occurs, the function where the error occurs and the error, and notifies the management apparatus Ks of the error via the device communication unit 61.

Figure 10:
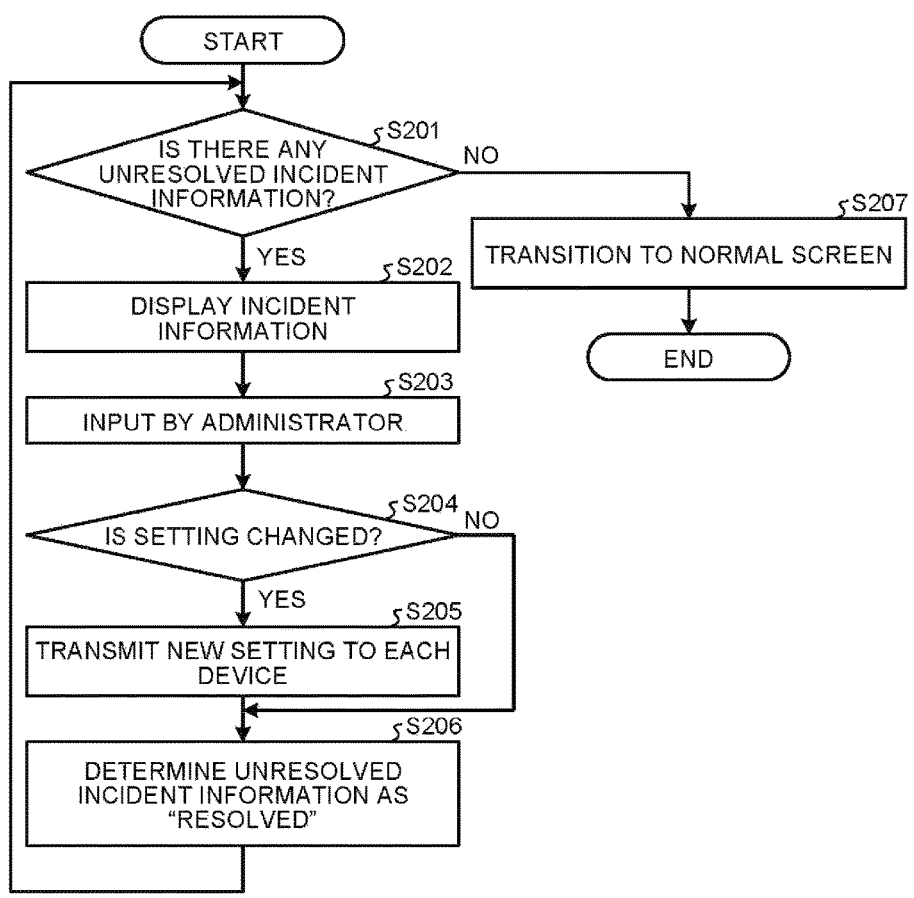
FIG. 10 is a flowchart illustrating error handling processing.

When the error is notified, the management apparatus Ks executes error handling processing illustrated in FIG. 10. That is, the management apparatus Ks checks whether there is any unresolved incident information (error information) at a predetermined timing, for example, a timing at which the administrator logs in, as illustrated in FIG. 10 (Step S201).

When there is any unresolved incident information at Step S201 (Yes at Step S201), the use situation acquiring unit 52 transmits the unresolved incident information to the presenting unit 53, and the presenting unit 53 displays the information (step S202). In this case, the presenting unit 53 displays, for example, an incident information report screen G2 as illustrated in FIG. 11 on the display of the output device 42. FIG. 11 represents that "External tool A", to which "Do not use" is set, once accesses the devices P1 to Pn.

The administrator views the incident information report screen G2 and is capable of easily recognizing the function or tool where the error occurs, and selects and inputs the handling processing while viewing the incident information report screen G2 (Step S203).

In other words, the incident information report screen G2 displays a "Change because I want to use" button and a "Check measures against unauthorized attacks" button, and the administrator operates either one of the buttons to select the handling processing.

The set-value determining unit 54 checks whether a change of setting is input in the incident information report screen G2 (Step S204).

When the change of setting is input at Step S204 (Yes at Step S204), the set-value determining unit 54 determines a setting item and a set value of changed contents, transmits the determined information to the set-value changing unit 55, and also notifies the use situation acquiring unit 52 accordingly. The set-value changing unit 55 transmits the setting item, the set value, and the setting command to each of the devices P1 to Pn via the management communication unit 51 (step S205). In each of the devices P1 to Pn, the storage control unit 62 registers the received setting item and set value in the function management information storage unit 63 based on the received setting command, to reflect the received setting item and the set value.

The use situation acquiring unit 52 determines the unresolved incident information that has been processed as Resolved based on the notification from the set-value determining unit 54 (Step S206), returns to Step S201, and processes the steps in the above manner (Step S201 to Step S206).

When there is no unresolved incident information at Step S201 (No at Step S201) the management apparatus Ks transitions to a normal screen and ends the error handling processing (Step S207).

Therefore, for example, when communication is rejected by the security setting at the time of introducing a new tool, the administrator can change the setting item of the function or the tool and the set value that cause the error to "Available" while viewing the incident information report screen G2. As a result, the administrator is able to easily find out the function or the tool where the error occurs from error occurrence date/time or the like, and to change it to become available even if he/she does not correctly understand the name of the function or of the tool.

FIG. 10 and FIG. 11 represent that a change of the setting item and the set value of the function or tool where an error occurs is uniformly performed on all the devices P1 to Pn to be managed, however, the change may be performed only on some of the devices P1 to Pn where an error occurs.

The device management system 1 according to the present embodiment has explained the case in which a single unit of the management apparatus Ks and a plurality of devices P1 to Pn to be managed are connected to each other via the networks NW1 and NW2, however, the configuration of the device management system 1 is not limited thereto. For example, the management apparatus Ks may be configured to be incorporated into one of the devices P1 to Pn to manage the device and the other devices. In the device management system 1, one management apparatus Ks may also be configured to manage only one device. Moreover, in the device management system 1, the management apparatus Ks may divide the devices P1 to Pn to be managed into a plurality of groups and set a common set value for the setting items for each group, or the devices P1 to Pn may be individually set.

In this way, the device management system 1 according to the present embodiment is configured so that the management apparatus Ks is a management apparatus (device management apparatus) that manages the devices (managed devices) P1 to Pn connected thereto via the networks NW1 and NW2, includes the presenting unit (presenting unit) 53 that presents use change information that allows the use change instruction of functions included in the devices P1 to Pn, the set-value determining unit (set-value determining unit) 54 that determines the set values of the various setting items required to execute the functions of the devices P1 to Pn to set values corresponding to the use change instruction, and the set-value changing unit (set-value changing unit) 55 that changes the set values of the setting items related to the function to which the use change is instructed, from the set values before the use change instruction to the determined set values for each of the devices P1 to Pn.

Therefore, the management apparatus Ks can collectively set the set values of the setting items for the functions based on simple information such as "Use" or "Do not use" input by the administrator for each function of the devices P1 to Pn to be managed, and is therefore capable of performing easily and adequately the security settings or the like for the use settings of the functions of the devices P1 to Pn.

The device management system 1 according to the present embodiment is configured so that the management apparatus (device management apparatus) Ks that manages the devices (managed devices) P1 to Pn connected thereto via the networks NW1 and NW2, executes the device management method that includes presenting use change information that allows the use change instruction of the functions included in the devices P1 to Pn, determining the set values of the various setting items required to execute the function to which the use change is instructed to set values corresponding to the use change instruction, and changing the set values of the setting items related to the function to which the use change is instructed, from the set values before the use change instruction to the determined set values for each of the devices P1 to Pn.

Therefore, the management apparatus Ks can collectively set the set values of the setting items for the functions based on simple information such as "Use" or "Do not use" input by the administrator for each function of the devices P1 to Pn to be managed, and is therefore capable of performing easily and adequately the security settings or the like for the use settings of the functions of the devices P1 to Pn.

Moreover, the device management system 1 according to the present embodiment is configured so that the management apparatus Ks that manages the devices P1 to Pn connected thereto via the networks NW1 and NW2, incorporates the program for causing a computer such as the CPU 31 to execute presenting processing of presenting the use change information that allows the use change instruction of the functions included in the devices P1 to Pn, set-value determining processing of determining the set values of the various setting items required to execute the functions of the devices P1 to Pn to the set values corresponding to the use change instruction, and set-value changing processing of changing the set values of the setting items related to the function to which the use change is instructed, from the set values before the use change instruction to the determined set values for each of the devices P1 to Pn.

Therefore, the management apparatus Ks can collectively set the set values of the setting items for the functions based on simple information such as "Use" or "Do not use" input by the administrator for each function of the devices P1 to Pn to be managed, and is therefore capable of performing easily and adequately the security settings or the like for the use settings of the functions of the devices P1 to Pn.

The device management system 1 according to the present embodiment is the device management system 1 in which the management apparatus (device management apparatus) Ks and the devices (management devices) P1 to Pn to be managed are connected to each other via the networks NW1 and NW2. Each of the devices P1 to Pn includes the device communication unit (device communication unit) 61 that communicates with the management apparatus Ks via the networks NW1 and NW2, the function management information storage unit (function management information storage unit) 63 that stores functions provided in the local device, setting items required to execute the function for each of the functions, and a set value corresponding to the use setting of the function for the setting item, the storage control unit (storage control unit) 62 that controls the storage of the setting item and the set value for each function of the function management information storage unit 63 according to the use change instruction from the management apparatus Ks, the function executing unit (function executing unit) 64 that executes the function based on the set value for the setting item, and the use situation managing unit (use situation managing unit) 65 that manages the use situations of the functions by the function executing unit 64. The management apparatus Ks includes the management communication unit (management communication unit) 51 that communicates with each of the devices P1 to Pn via the networks NW1 and NW2, the presenting unit (presenting unit) 53 that presents the use change information that allows a use change instruction of functions provided in the devices P1 to Pn, the set-value determining unit (set-value determining unit) 54 that determines set values corresponding to the use change instruction for the set values of various setting items required to execute the function to which the use change is instructed, and the set-value changing unit (set-value changing unit) 55 that changes the set values of the setting items related to the function to which the use change is instructed, from the set values before the use change instruction to the determined set values for the devices P1 to Pn.

Therefore, the management apparatus Ks can collectively set the set values of the setting items for the functions based on simple information such as "Use" or "Do not use" input by the administrator for each function of the devices P1 to Pn to be managed, and is therefore capable of performing easily and adequately the security settings or the like for the use settings of the functions of the devices P1 to Pn.

Moreover, the device management system 1 according to the present embodiment is configured so that the management apparatus Ks further includes the use situation acquiring unit (use situation acquiring unit) 52 that acquires a use situation of each function included in the devices P1 to Pn, and the presenting unit 53 presents the use situation information of each function and the use change information that allows the use change instruction of the function in the devices P1 to Pn.

Therefore, the management apparatus Ks can collectively set the set values of the setting items for the functions based on the simple information such as "Use" or "Do not use" input by the administrator for each function of the devices P1 to Pn to be managed and based on the use situation of each function in the devices P1 to Pn. As a result, it is possible to perform more easily and adequately the security settings or the like for the use settings of the functions of the devices P1 to Pn.

The device management system 1 according to the present embodiment is configured so that the management apparatus Ks further includes the each-function setting information storage unit (each-function setting information storage unit) 56 that stores various setting items required to execute the function for each function and a set value according to the execution stage of the function set for the setting item, and the set-value determining unit 54 refers to the each-function setting information storage unit 56 based on the use change instruction to determine set values of the setting items that can execute the function of the devices P1 to Pn to which the use change is instructed.

Therefore, the management apparatus Ks can adequately and speedily set the set value to a set value that can execute the function to which the use change is instructed by referring to the each-function setting information storage unit.

Moreover, the device management system 1 according to the present embodiment is configured so that the use situation acquiring unit 52 acquires the presence/absence information of a use request for each function included in the devices P1 to Pn as the use situation information and the presenting unit 53 presents information including even the presence/absence information of the use request for each function as the use situation information.

Therefore, the management apparatus Ks can perform the use change instruction of a function according to the use situation of the function in the devices P1 to Pn, and can easily set a more appropriate set value. In other words, there remains a problem that, when use of a new function or an external tool is requested after the use of the device is started, a set value for securely using all the functions and external tools that the user wants to use cannot be easily set.

The device management system 1 according to the present embodiment is configured so that when the use situation acquiring unit 52 acquires information such that there is a use request for a function in which the set value is registered as Not used, the presenting unit 53 of the management apparatus Ks presents even the information to that effect included in the use situation information.

Therefore, when there is a use request for the function in which the set value is registered as Not used, the management apparatus Ks can suitably perform the use change instruction and can easily set a more appropriate set value.

Moreover, the device management system 1 according to the present embodiment is configured so that the set-value determining unit 54 of the management apparatus Ks determines the set values of the setting items for the function based on the order of priority to prioritize ensuring of security.

Therefore, the management apparatus Ks can set a set value in which ensuring of security of the devices P1 to Pn is prioritized and can adequately improve the security.

The device management system 1 according to the present embodiment is configured so that when there is a plurality of functions to which the use change is instructed, the set-value determining unit 54 of the management apparatus Ks determines whether there is a common setting item commonly required among the functions, and sets, for the common setting item, a common set value corresponding to the use change instruction in all the functions.

Therefore, when there is a use change instruction of the functions for the devices P1 to Pn, the management apparatus Ks can set the set value capable of adequately executing all the functions.

Furthermore, the management apparatus Ks of the device management system 1 according to the present embodiment is configured so that the use situation acquiring unit 52 acquires even the presence/absence information of an additional function to the devices P1 to Pn, the presenting unit 53 presents the use situation information including the presence/absence information of the additional function and the use change information that allows even an instruction as to whether the additional function is used, and the set-value determining unit 54 determines, when there is a specification as to whether the additional function is used, set values corresponding to the instruction as to whether it is used, for the set values of the various setting items required to execute the additional function.

Therefore, when any function is added to the devices P1 to Pn, the management apparatus Ks can easily and adequately set the set values required to execute the additional function.

According to exemplary embodiments of the present invention, it is possible to easily set the set values adequate for purposes of using device functions.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device management apparatus configured to manage one or more managed devices, each device configured to connect to the device management apparatus via a network and configured to include one or more associated functions provided therein, each function executed according to one or more corresponding security setting items which are required to be set to respective security setting values for the device to operate the function, the device management apparatus comprising circuitry configured to perform a method comprising:
    (a) registering device management data in a storage device, the device management data including, for each associated function amongst the one or more functions provided in a managed device, use setting information indicating whether the associated function provided in the managed device is currently available for the managed device to operate;
    (b) presenting a selection screen to display the use setting information for the functions provided in the managed device and to receive a use change instruction of a specified function provided in the managed device, the use change instruction permitting the use setting information corresponding to the specified function to be changed, in a case that, prior to the use change instruction having been received, the specified function was unavailable to the managed device to operate;
    (c) determining, in response to receiving the use change instruction in (b), one or more security setting items of the managed device required to be set to respective security setting values, for the specified function provided by the managed device to be executed; and
    (d) changing, upon determining in (c) that the one or more security setting items of the managed device are required to be set to respective security setting values to execute the specified function, a first security setting item of the managed device, amongst said one or more security setting items, from a first setting value to a second setting value different from the first setting value of the first security setting item of the managed device, said first security setting item of the managed device being required to be set to said second setting value to enable the managed device to execute the specified function which was unavailable for the managed device to operate prior to the use change instruction being received in (b).

2. The device management apparatus according to claim 1, wherein the method performed by the circuitry further comprises:
acquiring use situation information of each function amongst the one or more functions provided in the managed device.

3. The device management apparatus according to claim 1, wherein the method performed by the circuitry further comprises:
referring to the storage device based on the use change instruction received in (b), to determine one or more security setting values of the one or more security setting items required to execute the specified function corresponding to the use change instruction.

4. The device management apparatus according to claim 2, wherein the method performed by the circuitry further comprises:
acquiring presence/absence information of a use request of each of the functions provided in the managed device, as the use situation information; and
presenting the use situation information which includes the presence/absence information of the use request of each of the functions.

5. The device management apparatus according to claim 3, wherein the method performed by the circuitry further comprises:
acquiring presence/absence information of a use request of each of the functions capable of being performed by the managed devices, as use situation information, and
presenting the use situation information which includes presence/absence information of the use request of each of the functions.

6. The device management apparatus according to claim 4, wherein,
when the acquired presence/absence information indicates that the use request is for a function amongst the one or more functions capable of being performed by the managed devices in which a setting value indicating the corresponding associated function is not available for the managed device to operate is registered, the circuitry is configured to present the use situation information including the acquired presence/absence information with the setting value indicating the corresponding associated function is not available for the managed device to operate.

7. The device management apparatus according to claim 5, wherein,
when the acquired presence/absence information indicates that the use request is for a function amongst the one or more functions capable of being performed by the managed devices in which a setting value indicating the corresponding associated function is not available for the managed device to operate is registered, the circuitry is configured to present the use situation information including the acquired presence/absence information with the setting value indicating the corresponding associated function is not available for the managed device to operate.

8. The device management apparatus according to claim 1, wherein,
the circuitry is configured to determine the one or more security setting values of the one of more security setting items for the specified function based on order of priority to prioritize ensuring of security.

9. The device management apparatus according to claim 1, wherein,
when the use change instruction received in (a) requests that a plurality of functions be made available for the managed device to operate, the circuitry is configured to determine whether there is a common setting item commonly required among the plurality of functions, and set, for the common setting item, a common security setting value corresponding to the use change instruction in each of the plurality of functions.

10. The device management apparatus according to claim 2, wherein, the method performed by the circuitry further comprises:
acquiring presence/absence information of an additional function capable of being performed by the managed device,
presenting the use situation information including the presence/absence information of the additional function and the use setting information in the selection screen to permit the use change instruction to include a request that the additional function be made available for the managed device to operate, and
determining, upon receiving specification that the additional function is to be made available for the managed device to operate, one or more security setting values corresponding to the additional function included in the received use change instruction, for the one or more security setting values of the one or more security setting items required to execute the additional function.

11. The device management apparatus according to claim 3, wherein, the method performed by the circuitry further comprises:
acquiring presence/absence information of an additional function provided in the managed device,
presenting the use situation information including the presence/absence information of the additional function and the use setting information in the selection screen to permit the use change instruction to include a request that the additional function be made available for the managed device to operate, and
determining, upon receiving specification that the additional function is to be made available for the managed device to operate, one or more security setting values corresponding to the additional function included in the received use change instruction, for the one or more security setting values of the one or more security setting items required to execute the additional function.

12. The device management apparatus according to claim 8, wherein, the circuitry is further configured to:
acquiring presence/absence information of an additional function provided in the managed device,
presenting the use situation information including the presence/absence information of the additional function and the use change setting information in the selection screen to permit the use change instruction to include a request that the additional function be made available for the managed device to operate, and determining, upon receiving specification that the additional function is to be made available for the managed device to operate, one or more security setting values corresponding to the additional function included in the received use change instruction, for the one or more security setting values of the one or more security setting items required to execute the additional function.

13. The device management apparatus according to claim 9, wherein, the circuitry is further configured to:

acquiring presence/absence information of an additional function provided in the managed device, presenting the use situation information including the presence/absence information of the additional function and the use setting information in the selection screen to permit the use change instruction to include a request that the additional function be made available to be made available for the managed device to operate, and determining, upon receiving specification that the additional function is to be made available for the managed device to operate, one or more security setting values corresponding to the additional function included in the received use change instruction, for the one or more security setting values of the one or more security setting items required to execute the additional function.

14. A device management system configured so that a device management apparatus and a managed device amongst one or more managed devices as a management target are connected to each other via a network, the managed devices being configured to include one or more associated functions provided therein, each function executed according to one or more corresponding security setting items which are required to be set to respective security setting values for the managed device to operate the function, wherein the managed device includes:
 a device communication interface configured to communicate with the device management apparatus via the network;
 a storage device configured to locally store the one or more functions included in the managed device, one or more setting items required to execute respective functions, and one or more set value corresponding to a use setting of the function for the setting item; and
 circuitry configured to control the storage of the one or more setting items and the one or more set values for each of the respective stored functions in accordance with a use change instruction from the device management apparatus, and execute the function based on the one or more set values for the respective setting items, and the device management apparatus includes circuitry configured to communicate with the managed device via the network and perform a method comprising:

(a) registering device management data in a storage device, the device management data including, for each associated function amongst the one or more functions provided in a managed device, use setting information indicating whether the associated function provided in the managed device is currently available for the managed device to operate;

(b) presenting a selection screen to display the use setting information for the functions provided in the managed device and to receive a use change instruction of a specified function provided in the managed device, the use change instruction permitting the use setting information corresponding to the specified function to be changed, in a case that, prior to the use change instruction having been received, the specified function was unavailable to the managed device to operate;

(c) determining, in response to receiving the use change instruction in (b), one or more security setting items of the managed device required to be set to respective security setting values, for the specified function provided by the managed device to be executed; and (d) changing, upon determining in (c) that the one or more security setting items of the managed device are required to be set to respective security setting values to execute the specified function, a first security setting item of the managed device, amongst said one or more security setting items, from a first setting value to a second setting value different from the first setting value of the first security setting item of the managed device, said first security setting item of the managed device being required to be set to said second setting value to enable the managed device to execute the specified function which was unavailable for the managed device to operate prior to the use change instruction being received in (b).

15. A device management method performed by a device management apparatus comprising circuitry configured to manage one or more managed devices, each device configured to connect to the device management apparatus via a network and configured to include one or more associated functions provided therein, each function executed according to one or more corresponding security setting items which are required to be set to respective security setting values for the device to operate the function, the device management method comprising:

(a) registering device management data in a storage device, the device management data including, for each associated function amongst the one or more functions provided in a managed device, use setting information indicating whether the associated function provided in the managed device is currently available for the managed device to operate;

(b) presenting a selection screen to display the use setting information for the functions provided in the managed device and to receive a use change instruction of a specified function provided in the managed device, the use change instruction permitting the use setting information corresponding to the specified function to be changed, in a case that, prior to the use change instruction having been received, the specified function was unavailable to the managed device to operate;

(c) determining, in response to receiving the use change instruction in (b), one or more security setting items of the managed device required to be set to respective security setting values, for the specified function provided by the managed device to be executed; and (d) changing, upon determining in (c) that the one or more security setting items of the managed device are required to be set to respective security setting values to execute the specified function, a first security setting item of the managed device, amongst said one or more security setting items, from a first setting value to a second setting value different from the first setting value of the first security setting item of the managed device, said first security setting item of the managed device being required to be set to said second setting value to enable the managed device to execute the specified function which was unavailable for the managed device to operate prior to the use change instruction being received in (b).

* * * * *

UNITED STATES PATENT AND TRADEMARK OFFICE
CERTIFICATE OF CORRECTION

| | | |
|---|---|---|
| PATENT NO. | : 10,250,772 B2 | Page 1 of 1 |
| APPLICATION NO. | : 15/253963 | |
| DATED | : April 2, 2019 | |
| INVENTOR(S) | : Hironori Horino | |

It is certified that error appears in the above-identified patent and that said Letters Patent is hereby corrected as shown below:

On the Title Page

Item (54) and in the Specification, Column 1, Lines 1-3, should read:
--DEVICE MANAGEMENT APPARATUS, DEVICE MANAGEMENT SYSTEM, AND DEVICE MANAGEMENT METHOD--

Signed and Sealed this
Twenty-eighth Day of April, 2020

Andrei Iancu
*Director of the United States Patent and Trademark Office*